United States Patent [19]
Keshav

[11] Patent Number: 5,761,289
[45] Date of Patent: Jun. 2, 1998

[54] 800 NUMBER CALLBACK

[75] Inventor: Srinivasan Keshav, Berkeley Heights, N.J.

[73] Assignee: AT&T Corp. Middletown, N.J.

[21] Appl. No.: 700,719

[22] Filed: Aug. 13, 1996

[51] Int. Cl.$^6$ .............................. H04M 3/42; H04M 1/57; H04M 3/48; H04Q 3/64

[52] U.S. Cl. .............. 379/201; 379/142; 379/207; 379/209; 379/216; 379/265; 379/309

[58] Field of Search .................. 379/127, 216, 379/265, 266, 309, 355, 214, 142, 201, 207, 209

[56] References Cited

U.S. PATENT DOCUMENTS

| | | | |
|---|---|---|---|
| 5,155,761 | 10/1992 | Hammond | 379/67 |
| 5,181,236 | 1/1993 | LaVallee et al. | 379/67 |
| 5,185,782 | 2/1993 | Srinivasan | 379/67 |
| 5,311,574 | 5/1994 | Livanos | 379/88 |
| 5,311,583 | 5/1994 | Friedes et al. | 379/209 |
| 5,406,616 | 4/1995 | Bjorndahl | 379/59 |
| 5,519,773 | 5/1996 | Dumas et al. | 379/265 |
| 5,553,133 | 9/1996 | Perkins | 379/216 X |
| 5,570,419 | 10/1996 | Cave et al. | 379/216 |

*Primary Examiner*—Harry S. Hong

[57] ABSTRACT

A method and system for handling incoming calls when no destination stations are available. When an incoming call from an originating station is received, it is determined whether a destination station is available. If a destination station is not available, a telephone number of the originating station is stored. Shortly before its current call is concluded, a destination station indicates its approaching availability. Responsive to this indication, an outgoing call is placed to the originating station. If the originating station does not answer the outgoing call within a predetermined time, the outgoing call is terminated and rescheduled. If the originating station answers the call within a predetermined time, the outgoing call is connected to the available destination station.

18 Claims, 5 Drawing Sheets

800 NUMBER CALLBACK

FIELD OF THE INVENTION

The present invention relates to a system and method for handling incoming calls when no destination stations are available and in particular to scheduling and placing return calls when destination stations become available.

BACKGROUND OF THE INVENTION

Customer service centers using 800 numbers have become very common. Many of these centers receive a large number of calls each day. A continuing problem has been how to handle calls when all customer service representatives are busy or otherwise unavailable. A variety of solutions have been proposed, including routing calls to less busy locations when particular locations cannot handle calls. However, this is an incomplete solution. Many companies only have one customer service location, hence routing the calls to another location is not possible. Furthermore, even multi-site customer service centers have a maximum call capacity. When this capacity is exceeded, there are no customer service representatives at any location who can handle additional incoming calls. A need arises for a method of handling calls even when all customer service representatives are busy or otherwise unavailable.

SUMMARY OF THE INVENTION

The present invention is a system and method for handling calls when all customer service representatives are busy or otherwise unavailable. When an incoming call from a customer is received, it is determined whether a customer service representative is available. If a customer service representative is not available, a telephone number of the station from which the customer called is stored. Shortly before its current call is concluded, a destination station indicates its approaching availability. Responsive to this indication an outgoing call is placed to the customer's station. If the customer's station does not answer the outgoing call within a predetermined time, the outgoing call is terminated and rescheduled. If the customer's station answers the call within a predetermined time, the outgoing call is connected to the available customer service representative.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
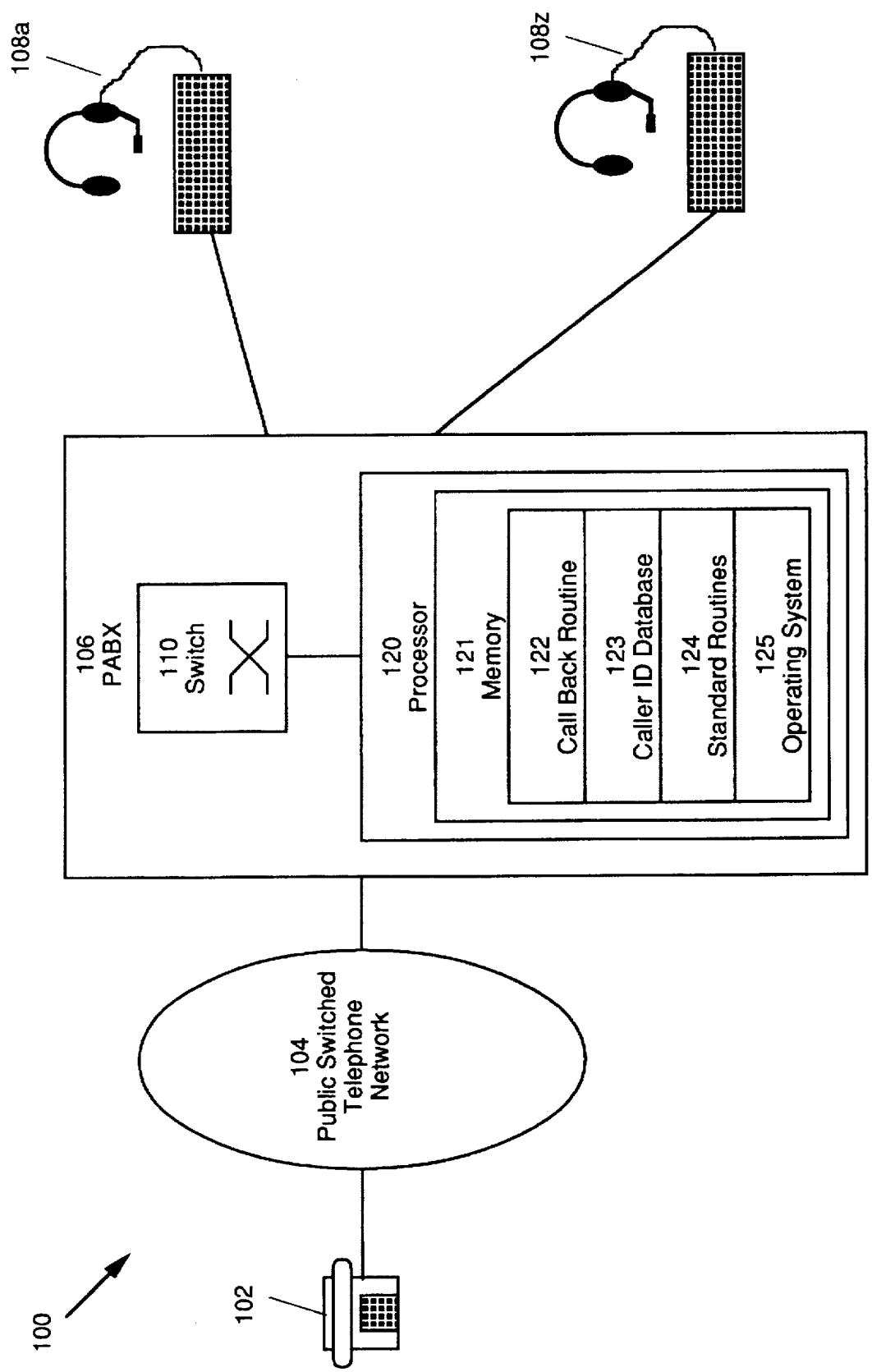
FIG. 1 is a block diagram of an 800 number call back system 100 in accordance with one embodiment of the present invention.

FIG. 1 is a block diagram of an 800 number call back system 100 in accordance with one embodiment of the present invention. A caller at originating station 102 places a call to an 800 number over public switched telephone network (PSTN) 104. PSTN 104 routes the call in a well-known manner to private automatic branch exchange (PABX) 106. PABX 106 receives the incoming call and selects as the destination station of the call a particular service representative station from among those service representative stations 108a–z connected to PABX 106 which are available. PABX 106 then routes the call to the selected station. PABX 106 includes switch 110, which connects incoming calls to selected service representative stations. Switch 110 also completes calls from service representative stations by initiating calls over PSTN 104 and connecting the calling service representative stations to the initiated calls. PABX 106 also includes processor 120 which controls switch 110. Processor 120 includes the standard elements, such as a central processing unit (CPU) and an interface to switch 110 by which it receives information from and sends commands to switch 110. Processor 120 also includes memory 121, which may include such devices as random access memory, read-only memory, and magnetic storage devices, such as disk and tape drives and optical storage devices. Memory 121 includes standard program elements, such as operating system 125 and standard program routines 124. However, memory 121 also includes call back routine 122, which implements the 800 number call back process of the present invention. Memory 121 also includes caller identification (ID) queue 123, which stores the telephone numbers of callers who are to be called back.

Figure 2:
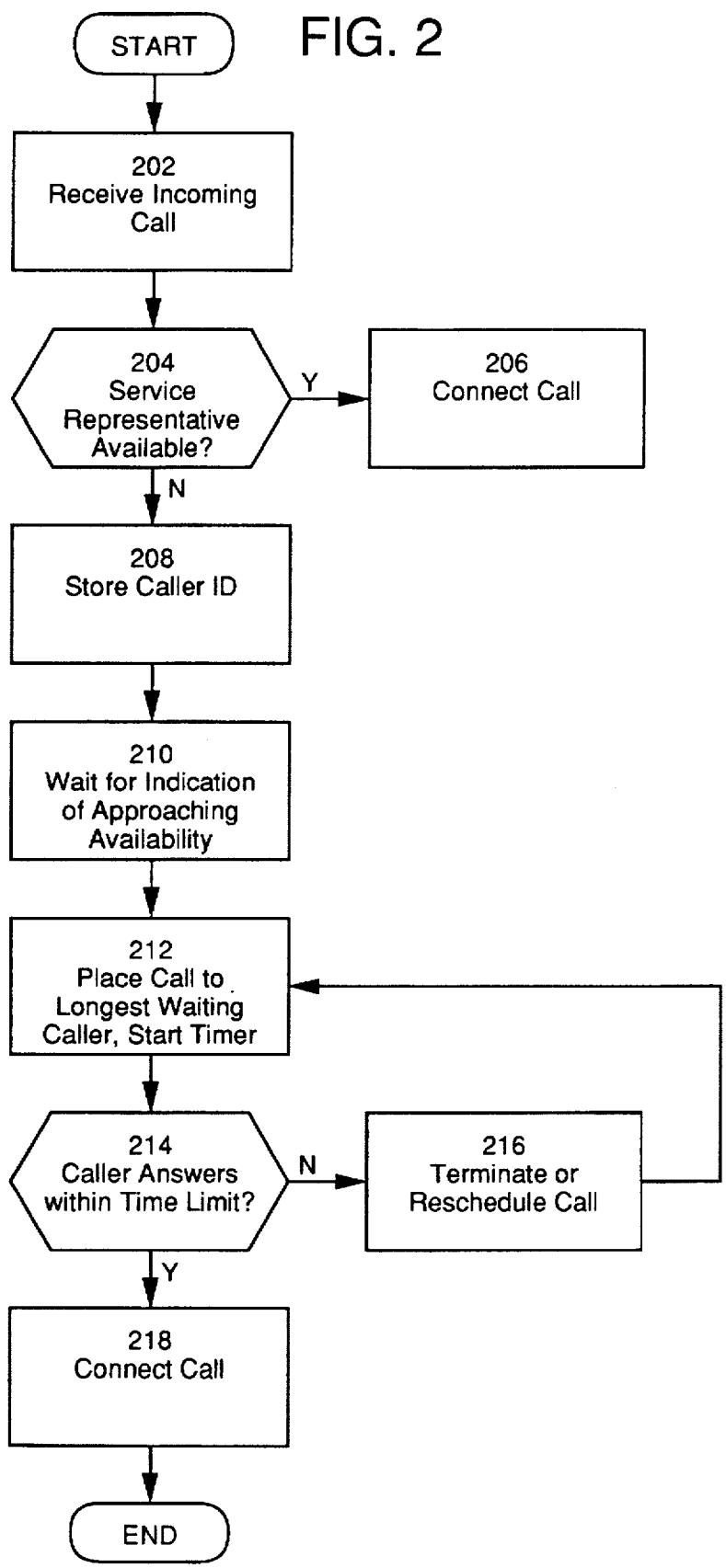
FIG. 2 is a flow diagram of a process 200 implemented by system 100 of FIG. 1.

FIG. 2 is a flow diagram of a process 200 implemented by system 100 of FIG. 1. The process begins with step 202, in which PABX 106 receives an incoming call. In step 204, PABX 106 determines whether a service representative station is free, which means that a service representative is available. If so, the process goes to step 206, in which the call is connected to the available service representative station. If not, the process goes to step 208, in which PABX 106 stores the telephone number from which the incoming call was placed in caller ID queue 123. This telephone number was obtained by PABX 106 from the caller ID or automatic number identification (ANI) information which accompanied the call.

The process then continues with step 210, in which PABX 106 waits for a service representative to transmit an indication of their approaching availability. A service representative would transmit this indication to PABX 106 by pressing a button on service representative station 106a–z shortly before the current call is concluded. While PABX 106 is waiting for an indication of approaching availability, other incoming calls may be received. Since no service representatives are available, steps 202 to 210 are repeated for each incoming call. When a an indication of approaching availability is received at PABX 106, the process goes to step 212, in which PABX 106 accesses caller ID queue 123 and obtains the ID of the caller who has been waiting the longest. Queue 123 is a first-in, first-out queue, so the longest waiting caller is simply the one who is at the head of the queue. PABX 106 initiates a callback by placing a call to the caller whose ID was obtained and initiates a timer. In step 214, PABX 106 waits for the caller to answer the call. If the timer expires before the call is answered, the process goes to step 216, in which the call is terminated and removed from the queue. The process then loops back to step 212, in which PABX 106 places a call to the next caller in the queue. Optionally, instead of deleting a call from the queue when the callback is not answered, the call may be rescheduled by storing the caller ID back in the queue. In addition, a counter may be established for each caller ID which indicates the number of times the call has been rescheduled. If the counter exceeds a predetermined limit, the call may then be removed from the queue.

If the caller answers the call before the timer expires, PABX 106 connects the call to the available service representative station.

The advantage of having a service representative indicate their approaching availability before their current call is concluded is that this causes the callback lead time to overlap with the remainder of the current call. A significant time may elapse from the time the callback is initiated until the callback is answered. If the callback was not initiated until a service representative had actually concluded their current call, the service representative would have to wait until the callback was completed. This would reduce the proportion of time during which service representatives would actually be connected with callers, thus reducing the efficiency of the customer service center. By contrast, the present invention provides an overlap of the callback lead time with customer calls, thus increasing efficiency of the customer service center.

Figure 3:
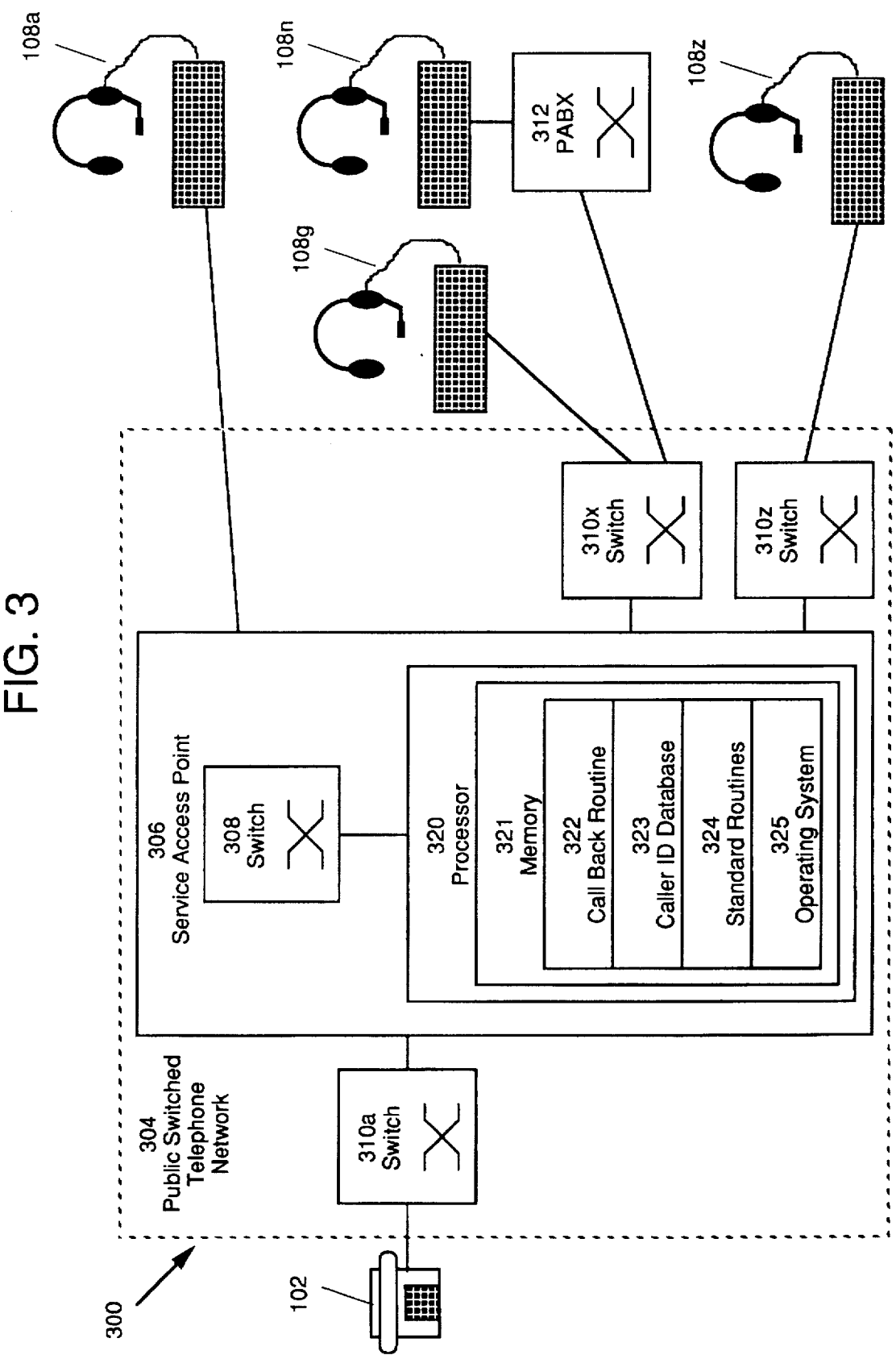
FIG. 3 is a block diagram of an 800 number call back system 100 in accordance with another embodiment of the present invention.

FIG. 3 is a block diagram of an 800 number call back system 100 in accordance with another embodiment of the present invention. A caller at originating station 102 places a call to an 800 number over public switched telephone network (PSTN) 304. In a well-know manner, PSTN 104 determines that the call to this particular 800 number is a special service call and routes the call through one or more switches 310a to service access point (SAP) 306. In a well-known manner, SAP 306 receives the incoming call, selects as the destination station of the call a particular service representative station from among those available service representative stations 108a–z coupled to SAP 306 and routes the call to the selected station. SAP 306 includes switch 308, which connects incoming calls to selected outgoing lines. SAP 306 also includes processor 320 which controls switch 310. Processor 320 includes the standard elements, such as a central processing unit (CPU) and an interface to switch 308 by which it receives information from and sends commands to switch 308. Processor 320 also includes memory 321, which may include such devices as random access memory, read only memory, and magnetic storage devices, such as disk and tape drives and optical storage devices. Memory 321 includes standard program elements, such as operating system 325 and standard program routines 124. Additionally, memory 321 also includes call back routine 322, which implements the 800 number call back process of the present invention. Memory 321 also includes caller identification (ID) queue 323, which stores the telephone numbers of callers who are to be called back.

Service representative stations 108a–z may be coupled to SAP 306 in a variety of ways. For example, in FIG. 3, service representative station 108z is coupled through PSTN switch 310z, service representative station 108a is connected directly to SAP 306, and service representative station 108n is connected to a PABX 312 which is itself connected to SAP 306 through switch 310x. Individual service representative stations 108a–z may be connected differently. Some may be directly connected to SAP 306, some may connect to other switches and some may connect to one or more PABX. All of these various configurations are well-known.

Figure 4:
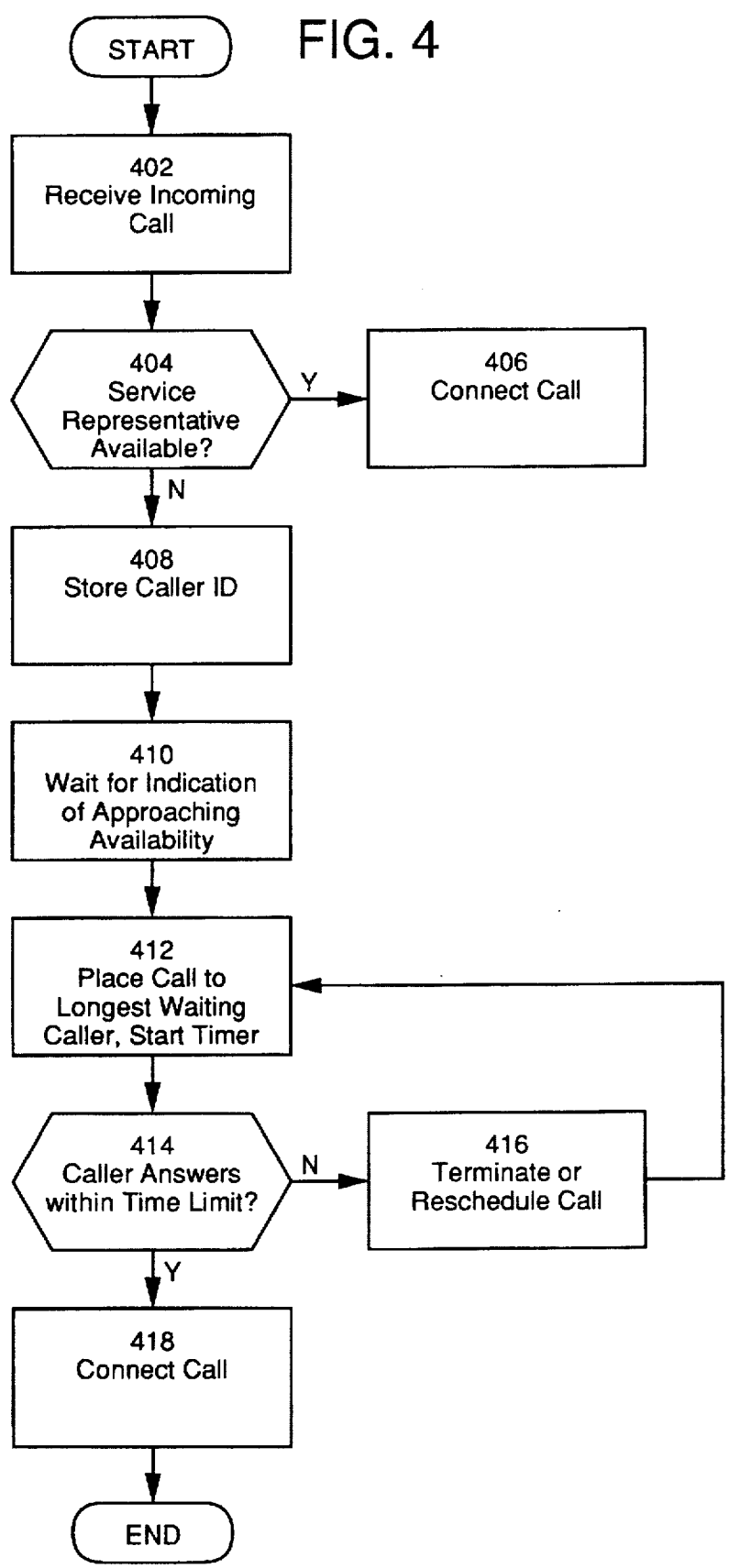
FIG. 4 is a flow diagram of a process 400 implemented by system 300 of FIG. 3.

FIG. 4 is a flow diagram of a process 400 implemented by system 300 of FIG. 3. The process begins with step 402, in which SAP 306 receives an incoming call. In step 404, SAP 306 determines whether a service representative station is free, which means that a service representative is available. If the service representative stations are connected to SAP 306 through a PABX or through intermediate switches, SAP 306 may make this determination in a well-known process by communicating signaling messages with the PABX or intermediate switches. If a service representative station is available, the process goes to step 406, in which the call is connected to the available service representative station either directly or, if appropriate, by routing to or through a PABX or intermediate switch. In the latter cases, the PABX or intermediate switch, having sent a signalling message to SAP 306 indicating the availability of a service representative station, may actually select the particular service representative station to which the call is connected. If it is determined that no service representatives are available, the process goes to step 408, in which SAP 306 stores the telephone number from which the incoming call was placed in caller ID queue 123. This telephone number was obtained by SAP 306 from the caller ID or automatic number identification (ANI) information which accompanied the call.

The process then continues with step 410, in which SAP 306 waits for a service representative to transmit an indication of their approaching availability. A service representative would transmit this indication to SAP 306 by pressing a button on service representative station 106a–z shortly before the current call is concluded. While SAP 306 is waiting for an availability indication, other incoming calls may be received. Since no service representatives are available, steps 402 to 410 are repeated for each incoming call. The availability indications of directly connected service representative stations will be detected directly. The availability indications of service representative stations which are connected to a PABX or an intermediate switch will be detected by receipt, at SAP 306, of a signalling message from the PABX or intermediate switch.

When a service representative indicates their approaching availability, the process goes to step 412, in which SAP 306 accesses caller ID queue 123 and obtains the ID of the caller who has been waiting the longest. Queue 123 is a first-in, first-out queue, so the longest waiting caller is simply the one who is at the head of the queue. SAP 306 places a call to the caller whose ID was obtained and initiates a timer. In step 414, SAP 306 waits for the caller to answer the call. If the timer expires before the call is answered, the process goes to step 416, in which the call is terminated and removed from the queue. The process then loops to step 412, in which SAP 306 places a call to the next caller in the queue. Optionally, instead of deleting a call from the queue when the callback is not answered, the call may be rescheduled by storing the caller ID back in the queue. In addition, a counter may be established for each caller ID which indicates the number of times the call has been rescheduled. If the counter exceeds a predetermined limit, the call may then be removed from the queue.

If the caller answers the call before the timer expires, SAP 306 connects the call to the available service representative station. If the service representative station is connected through a PABX or intermediate switch, the PABX or intermediate switch may actually select the particular service representative station to which the call is connected.

This embodiment of the present invention also provides an overlap of the callback lead time with customer calls, thus increasing efficiency of the customer service center.

Figure 5:
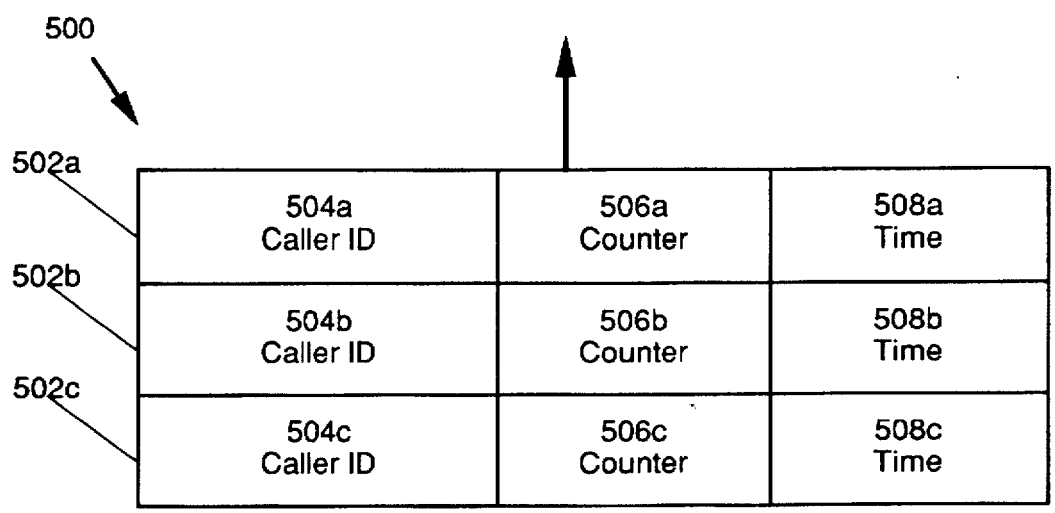
FIG. 5 is a block diagram of a caller ID queue 500, such as those shown in FIGS. 1 and 3.
Figure 5:
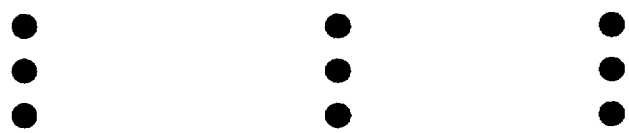
Figure 5:
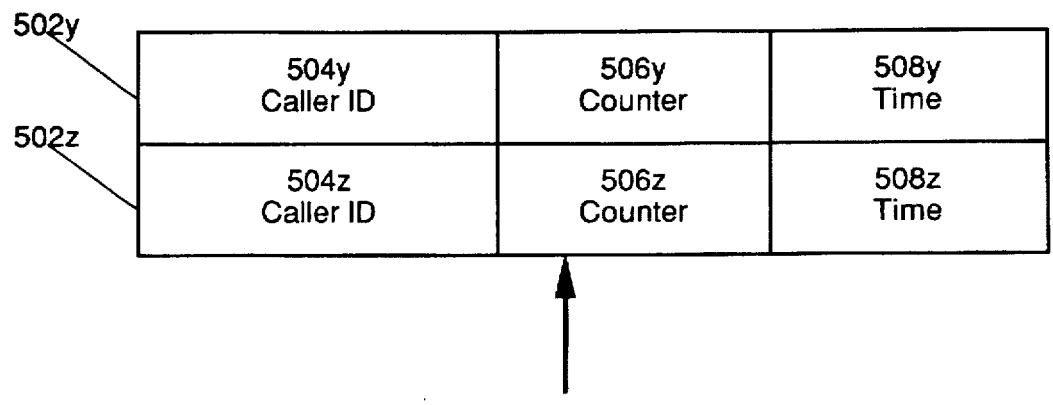

FIG. 5. is a block diagram of a caller ID queue 500, such as the caller ID queue 123 of system 100 or caller ID queue 323 of system 300. Queue 500 includes a plurality of records, shown as records 502a–z in FIG. 4. Each record includes a caller ID field, shown as fields 504a–z, a counter field, shown as fields 506a–z, and a time field, shown as fields 508a–z. The caller ID field 508a–z contains a telephone number of a caller who placed a call when no service representatives were available. This telephone number was obtained by PABX 106 from the caller ID or ANI information which accompanied the call, or by SAP 306 from the ANI which accompanied the call. The counter field 506a–z contains a count of the number of times PABX 106 or SAP 306 attempted to place a call to the telephone number contained in the caller ID field of the record. This count is incremented each time a call attempt is made. If the count exceeds a predetermined maximum, no further call attempts to that telephone number are made and the record is deleted from queue 500. The time field 508a–z contains the time that the call was first received at PABX 106 or SAP 306. This field allows calls which have been in queue 500 longer than a predetermined amount of time to be deleted, even if the number of call attempts has not yet exceeded the maximum.

Record 502a is at the head of queue 500; it is the record which will be accessed next and contains information regarding the call which is to be placed next. Record 502z is at the foot of queue 500. It is the record which was most recently placed in the queue.

Although a specific embodiment of the present invention has been described, it will be understood by those of skill in the art that there are other embodiments which are equivalent to the described embodiment. Accordingly, it is to be understood that the invention is not to be limited by the specific illustrated embodiment, but only by the scope of the appended claims.

What is claimed is:

1. A method for handling incoming calls when no destination stations are available, comprising the steps of:

receiving an incoming call from an originating station;
   determining whether a destination station is available;
   storing a telephone number of the originating station, if a destination station is not available;
   receiving an indication of approaching availability from the destination station; and
   responsive to receiving the indication of approaching availability, placing an outgoing call to the originating station.

2. The method of claim 1, further comprising the step of:
   terminating the outgoing call, if the originating station does not answer the outgoing call within a predetermined time.

3. The method of claim 2, further comprising the step of:
   rescheduling the outgoing call, if the originating station does not answer the outgoing call within a predetermined time.

4. The method of claim 2, further comprising the steps of:
   rescheduling the outgoing call, if the originating station does not answer the outgoing call within a predetermined time;
   counting the number of times the outgoing call has been rescheduled; and
   deleting the telephone number of the originating station, if the outgoing call has been rescheduled a predetermined number of times.

5. The method of claim 1, further comprising the step of:
   connecting the outgoing call to the available destination station, if the originating station answers the outgoing call within a predetermined time.

6. The method of claim 1, further comprising the step of:
   deleting the telephone number of the originating station, if the time elapsed from receipt of the incoming call exceeds a predetermined maximum.

7. The method of claim 1, wherein the step of receiving an indication of approaching availability from the destination station comprises the step of:
   receiving from an operator of the destination station an indication that the destination station will become available within a predetermined time.

8. A method for handling incoming calls when no destination stations are available, comprising the steps of:

receiving a plurality of incoming calls from a plurality of originating stations; for each incoming call, repeating the steps of:
   determining whether a destination station is available;
   storing, at the foot of a first in, first out queue, an indicator including a telephone number of the originating station, if a destination station is not available;
   receiving an indication of approaching availability from the destination station;
   responsive to receiving an indication of approaching availability from the destination station, placing an outgoing call to an originating station indicated by an indicator at a head of the queue.

9. The method of claim 8, further comprising the step of:
   terminating the outgoing call, if the originating station does not answer the outgoing call within a predetermined time.

10. The method of claim 9, further comprising the step of:
    moving the indicator at the head of the queue to the foot of the queue, if the originating station does not answer the outgoing call within a predetermined time.

11. The method of claim 9, wherein the indicator further comprises a counter, further comprising the steps of:
    moving the indicator at the head of the queue to the foot of the queue, if the originating station does not answer the outgoing call within a predetermined time;
    incrementing the counter; and
    deleting the indicator, if the counter exceeds a predetermined maximum.

12. The method of claim 8, further comprising the step of:
    connecting the outgoing call to the available destination station, if the originating station answers the outgoing call within a predetermined time.

13. The method of claim 8, wherein the indicator further comprises a time at which the incoming call was received, further comprising the steps of:
    comparing the time at which the incoming call was received with a current time; and
    deleting the indicator, if the time elapsed from receipt of the incoming call exceeds a predetermined maximum.

14. The method of claim 8, wherein the step of receiving an indication of approaching availability from the destination station comprises the step of:
    receiving from an operator of the destination station an indication that the destination station will become available within a predetermined time.

15. A system for handling incoming calls when no destination stations are available, comprising:

a first receiver, coupled to a public switched telephone network, receiving an incoming call from an originating station and outputting an indication that an incoming call has been received and a telephone number of the originating station of the incoming call;

a detector, coupled to a plurality of destination stations, determining and outputting an indication of whether a destination station is available;

a memory, responsive to the indication that a destination station is not available, storing a telephone number of the originating station;

a second receiver, receiving an indication of approaching availability from the destination station; and a call originator, responsive to receipt of the indication of approaching availability, placing an outgoing call to the originating station.

16. The system of claim 15, wherein the call originator further terminates the outgoing call, if the originating station does not answer the outgoing call within a predetermined time.

17. The system of claim 15, further comprising:

a rescheduler, rescheduling the outgoing call, if the originating station does not answer the outgoing call within a predetermined time.

18. The system of claim 15, further comprising:

a call connector, connecting the outgoing call to the available destination station, if the originating station answers the outgoing call within a predetermined time.

* * * * *